United States Patent
Volk et al.

(10) Patent No.: US 11,461,802 B2
(45) Date of Patent: Oct. 4, 2022

(54) METHOD AND APPARATUS FOR TARGETING MEDIA TO A USER VIA A THIRD PARTY

(71) Applicants: AT&T Intellectual Property I, L.P., Atlanta, GA (US); Interwise Ltd., Ben-Gurion Airport (IL)

(72) Inventors: Yehuda Volk, Tel-Aviv (IL); Erez A. Korn, Rosh Ha'Ayin (IL); Hans Fischmann, Wellesley, MA (US); Rinat Zilberstein, Tel-Aviv (IL)

(73) Assignees: AT&T Intellectual Property I, L.P., Atlanta, GA (US); Interwise Ltd., Ben-Gurion Airport (IL)

( * ) Notice: Subject to any disclaimer, the term of this patent is extended or adjusted under 35 U.S.C. 154(b) by 80 days.

(21) Appl. No.: 16/220,375

(22) Filed: Dec. 14, 2018

(65) Prior Publication Data

US 2020/0193472 A1   Jun. 18, 2020

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0254* (2013.01); *G06Q 30/0269* (2013.01)

(58) Field of Classification Search
None
See application file for complete search history.

(56) References Cited

U.S. PATENT DOCUMENTS

| 7,783,710 B2 | 8/2010 | Ramaswamy |
| 8,666,836 B2 | 3/2014 | Adams |
| 8,682,720 B1 * | 3/2014 | Wills ..... G06Q 30/02 705/14.4 |

(Continued)

FOREIGN PATENT DOCUMENTS

| CA | 2450417 C | * 11/2011 | ........... G11B 27/329 |

OTHER PUBLICATIONS

Saeed, Sayyadi et al., "The investigation of the relationship between consumer perceptions of the company social responsibility and advertising recommendations (case study consumers of detergent products in the Sirjan city)", International Journal of Humanities and Cultural Studies (IJHCS) ISSN 2356-5926 (2016): 99-113., 2016, 15 pages.

*Primary Examiner* — Meredith A Long
(74) *Attorney, Agent, or Firm* — Guntin & Gust, PLC; Mark Wilinski

(57) ABSTRACT

Aspects of the subject disclosure may include, for example, receiving, from a first client device, a recommendation pertaining to an advertisement, storing a sender identification in association with an identification of the advertisement, wherein the sender identification includes an identification of the first client device, an identification of a first user of the first client device, or a combination thereof, determining that a score associated with the recommendation exceeds a threshold at least in terms of a likelihood of relevance of the advertisement to a second user of a second client device, based on the determining, transmitting the advertisement to the second client device based on the (Continued)

identification of the advertisement, and based on the determining, transmitting the sender identification to the second client device. Other embodiments are disclosed.

20 Claims, 9 Drawing Sheets

(56) References Cited

U.S. PATENT DOCUMENTS

| | | | |
|---|---|---|---|
| 9,754,292 B1 | 9/2017 | Pattan et al. | |
| 2002/0120507 A1 | 8/2002 | Chanos et al. | |
| 2007/0043766 A1* | 2/2007 | Nicholas | H04L 51/32 |
| 2009/0132365 A1 | 5/2009 | Gruenhagen et al. | |
| 2010/0057872 A1* | 3/2010 | Koons | H04L 51/14 |
| | | | 709/206 |
| 2010/0312624 A1* | 12/2010 | Bilenko | G06Q 30/02 |
| | | | 705/14.5 |
| 2011/0154386 A1* | 6/2011 | Cochinwala | G06Q 30/02 |
| | | | 725/14 |
| 2013/0091013 A1 | 4/2013 | Wang et al. | |
| 2013/0339127 A1* | 12/2013 | Plut | G06Q 30/02 |
| | | | 705/14.42 |
| 2014/0156746 A1 | 6/2014 | Wheatley | |
| 2016/0044120 A1 | 2/2016 | Williams et al. | |
| 2016/0117732 A1* | 4/2016 | Zou | G06Q 30/0264 |
| | | | 705/14.54 |
| 2016/0140601 A1 | 5/2016 | Blackhurst et al. | |
| 2017/0046740 A1 | 2/2017 | Abbas | |
| 2019/0116239 A1* | 4/2019 | Jagannath | H04L 41/0896 |

* cited by examiner

200d

METHOD AND APPARATUS FOR TARGETING MEDIA TO A USER VIA A THIRD PARTY

FIELD OF THE DISCLOSURE

The subject disclosure generally relates to targeting media to a user, and more specifically, to targeting the media to the user via a third party.

BACKGROUND

In the context of targeted advertising, advertisers target specific groups of users/people with specific advertisements. For example, knowing demographics of users/people residing in a house enables an advertiser (or network/service operator/provider) to select advertisements that will likely appeal to the residents. Conventional targeted advertising systems/environments rely on personalization/customization of advertisements delivered to a given user based on collecting information associated with the user. Even with the availability of the user information informing the selection process, experience suggests that there are still relatively low levels of user engagement with respect to the advertisements provided. For example, many users pay little attention to, and even completely ignore, advertisements that are provided/presented.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for targeting media to a user. In some embodiments, the media includes an advertisement. In some embodiments, the media is selected based on a recommendation received from a contact (e.g., a friend). Other embodiments are described in the subject disclosure.

One or more aspects of the subject disclosure include receiving from a first device an identification of media recommended for consumption by a second user of a second device. A sender identification may be stored in association with the identification of the media, wherein the sender identification may include an identification of the first user, the first device, or a combination thereof. A determination may be made that the media and/or recommendation has a score that exceeds a threshold in terms of a likelihood of relevance of the media to the second user. Responsive to determining that the score exceeds the threshold, the media, the identification of the media, or a combination thereof, may be transmitted to the second device. Responsive to determining that the score exceeds the threshold, the sender identification may be transmitted to the second device.

One or more aspects of the subject disclosure include transmitting, by a first device associated with a first user, a recommendation for media to be consumed by a second user of a second device. The first user and the second user may be contacts with one another. For example, the first user and the second user may be contacts on a social media platform, in an email database, in a phone database, in an instant messenger database, or a combination thereof. In some embodiments, the recommendation may include, or be associated with, a message generated by the first device. The message may include an indication (e.g., an explanation, a rating, etc.) of the relevance of the media to the second user as perceived by the first user.

One or more aspects of the subject disclosure include receiving, by a second device associated with a second user, a first recommendation for media to be consumed by the second user. The first recommendation received by the second device may be based on a second recommendation that may be generated and/or transmitted by a first device associated with a first user. The media may be obtained based on an indication of an address included with the first recommendation. The obtained media may be presented at/by the second device. The second device may transmit status regarding a likelihood/probability that the second user consumed the media.

Figure 1:
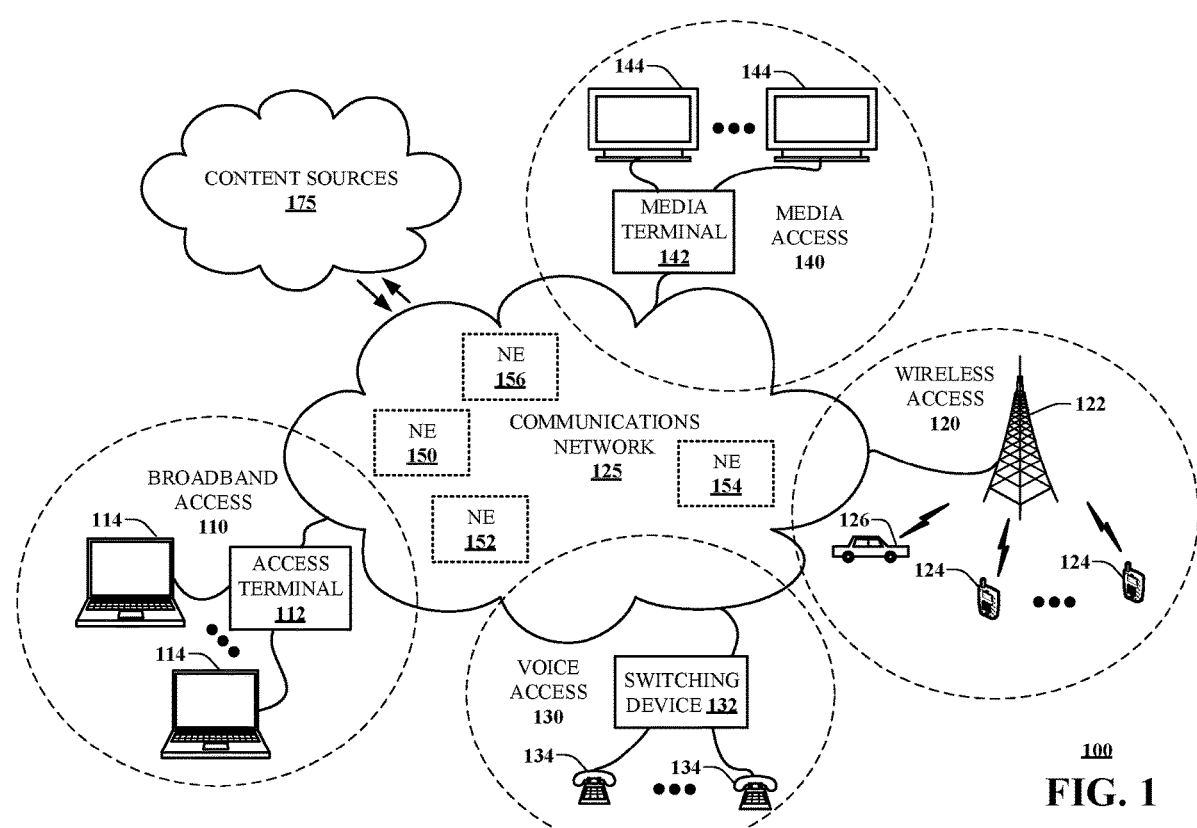
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
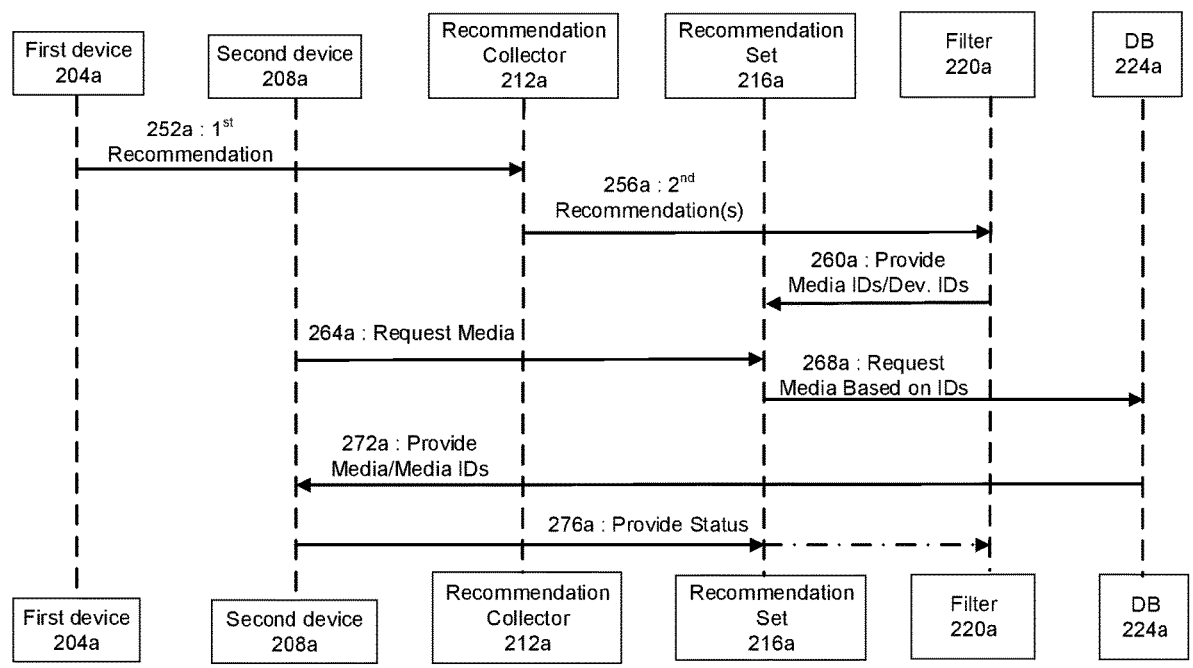
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a block diagram of a system 200a functioning within the communication network of FIG. 1 in accordance with various aspects described herein. The system 200a may include a first device 204a, a second device 208a, a recommendation collector 212a, a recommendation set 216a, a filter 220a, and a database (DB) 224a. In some embodiments, one or more of the aforementioned entities 204a-224a may be implemented in/using hardware, software, firmware, or a combination thereof. In some embodiments, the first device 204a, the second device 208a, or a combination thereof, may include a user/client device, a media processor (e.g., a set-top box), a gateway, a router, a server, etc. While shown separately, in some embodiments two or more of the recommendation collector 212a, the recommendation set 216a, the filter 220a, or the DB 224a may be implemented/housed within a common device, such as for example a server.

Superimposed in FIG. 2A are various arrows 252a-276a. The arrows 252a-276a may be representative of steps/operations/functionality that may be executed in conjunction with the entities 204a-224a as described further below.

The first device 204a may provide a first recommendation 252a. The first recommendation 252a may be generated in response to a request or command by a first user of the first device 204a.

The first recommendation 252a may include a first media item, an identification of the first media item, or a combination thereof. The first media item and/or the identification of the first media item may pertain to, without limitation, a movie, a television program, a video on demand (VOD) asset, an advertisement, a live event (e.g., news, a sporting event, etc.), audio (e.g., music, a book-on-tape), still-frame images, panoramic content, etc. The identification of the first media item may include a uniform resource locator (URL), an address, or any other identifier that may distinguish the first media item from other media items.

The first recommendation 252a may include an identification of: the first user, the first device 204a, or a combination thereof. For example, the identification may include the first user's name, the first user's work/employment address, the first user's home address, a first telephone number associated with the first user and/or the first device 204a, a first instant messenger username, a first email address, a first username associated with a social media platform, etc., or a combination thereof.

The first recommendation 252a may include an identification of: a second user associated with the second device 208a, the second device 208a, or a combination thereof. For example, the identification may include the second user's name, the second user's work/employment address, the second user's home address, a second telephone number associated with the second user and/or the second device 204a, a second instant messenger username, a second email address, a second username associated with a social media platform, etc., or a combination thereof.

The first recommendation 252a may be provided (e.g., transmitted) to, and obtained (e.g., received) by, the recommendation collector 212a. The recommendation collector 212a may pool/group/aggregate a plurality of recommendations (including the first recommendation 252a shown in FIG. 2A) obtained from a plurality of devices (including the first device 204a shown in FIG. 2A).

The recommendation collector 212a may provide (e.g., transmit) the recommendation(s) (inclusive of the first recommendation 252a) that the recommendation collector 212a obtains to the filter 220a as one or more second recommendations 256a. To the extent that a recommendation (e.g., the first recommendation 252a) obtained by the recommendation collector 212a does not include an identification of the source/sender (e.g., the first device 204a, the first user of the first device 204a, or the combination thereof) of the recommendation, the recommendation collector 212a may append the identification of the source/sender as part of providing the second recommendation(s) 256a. For example, the recommendation collector 212a may infer the identification of the source/sender based on a communication session or link that may exist between the source/sender and the recommendation collector 212a.

In response to obtaining (e.g., receiving) the second recommendation(s) 256a, the filter 220a may generate a score/rank the second recommendation(s) 256a. For example, in generating the score, the filter 220a may analyze one or more factors including: a history/log of media previously provided to (e.g., consumed/observed/viewed/listened to by) the second user/second device 208a, a history/log of applications or programs executed by the second device 208a, a history/log of communication (e.g., voice, data, videoconference, instant message, text, email, etc.) sessions that the second device 208/second user has engaged in, a history/log of products or services that the second device 208/second user has consumed or purchased, a history/log of status regarding recommendations accepted/processed or declined/rejected by the second device 208/second user, a contacts (e.g., friends) list associated with the second device 208a/second user, a message included with a recommendation included in the second recommendations, etc., or a combination thereof. In some embodiments, a first of the factors may be weighted relative to one or more of the other factors in generating the score. A particular weighting that may be used may be determined in accordance with one or more requirements or specifications.

A score generated by the filter 220a may pertain to a specific media item and/or recommendation. For example, the filter 220a may score each media item and/or recommendation on an individual basis. In some embodiments, the filter 220a may apply a given score to a plurality of media items and/or recommendations in the aggregate. Applying a score on an aggregate basis may help to conserve resources (e.g., computing resources) of the filter 220a and may lend itself to instances where media items and/or recommendations are pooled/combined for the sake of efficiency (e.g., economic efficiency, technical efficiency, etc.).

A score generated by the filter 220a may represent a likelihood/probability that the second user of the second device 208a will find the media item(s) associated with the score relevant/appealing/interesting. For example, where the media item(s) include an advertisement, the score may be representative of the likelihood/probability that the second user will consume the advertisement. Consumption of an advertisement may include, e.g., a selection of the advertisement on the second device 208a (or any other device), browsing to a website/webpage associated with a product/service presented in the advertisement, purchasing the product/service presented in the advertisement, etc.

In some embodiments, the filter 220a may select a subset of recommendations/media items based on the scores generated by the filter 220a. For example, the filter 220a may select 'X' recommendations/media items with the highest scores, where 'X' is a number. In this respect, the filter 220a may sort scores that are generated and select as the subset of recommendations/media items the highest 'X' scores.

In some embodiments, the filter 220a may select a recommendation/media item (or a set of recommendations/media items) based on the score for the recommendation/media item (or the set of recommendations/media items) exceeding a threshold. For example, the filter 220a may select a recommendation/media item that has a score that exceeds a threshold 'Y', where 'Y' is a number (for example).

The values for 'X' and 'Y' described above in conjunction with the selections by the filter 220a may be predefined/predetermined, may be based on a user-specified preference, etc. The filter 220a may provide (e.g., transmit) the identification(s) of the media item(s) that were selected by the filter 220a to the recommendation set 216a in conjunction with the arrow 260a. The filter 220a may provide (e.g., transmit) the identification(s) of the device(s) (e.g., the first device 204a) and/or user(s) (e.g., the first user) that was/were responsible for recommending (e.g., first recommendation 252a) the media item(s) in the first instance to the recommendation set 216a in conjunction with the arrow 260a. The filter 220a may provide (e.g., transmit) the identification of the second device 208a/second user to the recommendation set 216a in conjunction with the arrow 260a.

Thus, following execution of the step 260a, the recommendation set 216a may include/store an identification of one or more media items that the filter 220a identified as likely being of interest to the second device 208a/second user as well as an identification of one or more devices (e.g., the first device 204a) and/or users (e.g., the first user) that recommended the media item(s).

In step 264a, the second device 208a may provide (e.g., transmit) a request for a media item. For example, the request may be generated at the second device 208a in response to the second user requesting the same. Such a request may be based on, e.g., a search, a browsing of an electronic/interactive programming guide, entry of keywords (e.g., typed keywords, spoken keywords, etc.) into an application executing on the second device 208a, etc.

In some embodiments, the request of step 264a may be based on a predesignated/predefined timeslot associated with a playback of a second media item. For example, if the second media item is a television program, the request may be based on an advertising timeslot included as part of the transmission and playback/presentation of the television program. In this respect, the request may serve to obtain (e.g., fetch) an advertisement for playback/presentation during the advertising timeslot.

In some embodiments, the request of step 264a may be based on network load/traffic conditions. For example, the request 264a may be generated at a time when a network is lightly loaded (e.g., when network traffic is less than a threshold) in order to increase efficiency in terms of network resource utilization.

The request 264a may include the identification of: the second user associated with the second device 208a, the second device 208a, or the combination thereof.

The request of step 264a may be obtained (e.g., received) by the recommendation set 216a. In response to obtaining the request 264a, the recommendation set 216a may use the identification included with the request 264a to access a listing of media items that are likely of interest to the second device 208a/second user (as selected by the filter 220a as described above). In some embodiments, the recommendation set 216a may be able to infer the identification based on a communication link/session established between the recommendation set 216a and the second device 208a, such that the request 264a might not include the identification of: the second user associated with the second device 208a, the second device 208a, or the combination thereof.

Based on accessing the listing, the recommendation set 216a may select one or more of the media items in the listing for transmission to the second device 208a. The media item(s) selected by the recommendation set 216a may be based on one or more factors. For example, in the context of advertising, the media item(s) may be selected based on a run-time of the advertisement relative to a duration of an advertising timeslot. In the context of network operations, the advertisement may be selected to adhere to one more quality of service (QoS) metrics in terms of delivery to, or presentation at, the second device 208a. The scores generated by the filter 220a may serve as yet another factor in the selection. Other factors may be considered as part of the selection by the recommendation set 216a.

The recommendation set 216a may provide (e.g., transmit) a request for media to the DB 224a as shown in conjunction with step/arrow 268a based on the selection of the media item(s) by the recommendation set 216*a* described above. The request of step 268*a* may include the identification(s) of the media item(s) selected by the recommendation set 216*a*. The request of step 268*a* may include an identification of the target of the media item(s) (e.g., the identification of the second user, the second device 208*a*, or the combination thereof).

In response to obtaining (e.g., receiving) the request for media from the recommendation set 216 as shown via arrow 268*a*, the DB 224*a* may access the media item(s) identified in the request 268*a*. For example, the DB 224*a* may access those media item(s) from a memory/storage associated with the DB 224*a*. Once the media item(s) are obtained, the DB 224*a* may provide (e.g., transmit) the media item(s) and/or the identification(s) of the media item(s) to the second device 208*a* in conjunction with step 272*a*. Also, as part of step 272*a*, the recommendation set 216*a* may provide (e.g., transmit) an identification associated the users and/or devices that recommended the media item(s) to the second device 208*a*.

Upon obtaining (e.g., receiving) the media item(s) in step 272*a*, the second device 208*a* may present one or more of the media item(s). For example, the presentation of a media item may include a playing/play-back of video on a display device, a rendering of one or more still-frame images on the display device, a rendering of audio on/by one or more output devices (e.g., a speaker, a headset, etc.), etc. In some embodiments, the second device 208*a* may save/store the media item(s) and/or the identifications of the media item(s) for a subsequent/later-in-time presentation. For example, aspects of the saving/storage may pertain to a recording of a media item, such as for example in connection with a digital video recorder (DVR).

In step 276*a*, the second device 208*a* may provide (e.g., transmit) status regarding the consumption (or lack thereof) of the media item(s) presented by the second device 208*a*. For example, the status may be generated based on a use of gaze tracking technology to determine a likelihood of whether the second user of the second device 208*a* viewed the media item(s). In some embodiments, the status may be generated based on a questionnaire/survey that the second user may submit following the presentation of the media item(s). In some embodiments, the status may include an identification of whether the second device 208*a* was involved in a communication session during the presentation of the media item(s). In some embodiments, the status may be based on whether the user took some specified action, such as for example selecting the media item(s) on the second device 208*a* (or any other device), browsing to a website/webpage associated with a product/service presented in the media item(s), purchasing the product/service presented in the media item(s), etc.

The status provided by the second device 208*a* in conjunction with step 276*a* may be accompanied by/include the identification of the media item(s) that were presented by the second device 208*a*.

In some embodiments, the status provided by the second device 208*a* in conjunction with step 276*a* may be accompanied by/include the identification of the second user, the second device 208*a*, or the combination thereof. Alternatively, that identification may be inferred by, e.g., the recommendation set 216*a* and/or the filter 220*a* based on a communication session/link that may be established between the second device 208*a* and the recommendation set 216*a*/filter 220*a*.

The status provided by the second device 208*a* in conjunction with step 276*a* may be obtained (e.g., received) by the recommendation set 216*a* and/or the filter 220*a*. The recommendation set 216*a* and/or the filter 220*a* may take one or more actions in response to obtaining the status of step 276*a*. For example, if the status of step 276*a* indicates that a media item was likely ignored by the second user during the presentation of the media item on, e.g., the second device 208*a*, the media item may be removed from the recommendation set 216*a* for the second user/second device 208 for purposes of future media consumption by the second user/second device 208 and/or may have its associated score lowered by the filter 220*a*. If, on the other hand, the status of step 276*a* indicates that the media item was likely consumed by the second user during the presentation of the media item on, e.g., the second device 208*a*, the media item may have its associated score increased by the filter 220*a* and/or may serve to boost a weighting applied to recommendations submitted by devices/users (e.g., first device 204*a*) in the future that were responsible for recommending the media item (e.g., as part of the first recommendation 252*a*) for the second user/second device 208*a* in the first instance. In this manner, aspects of the disclosure may incorporate artificial intelligence and/or machine learning technologies to adapt the selection process for targeting media items for user/device consumption.

In some embodiments, the status of step 276*a* may be used to compensate network/service operators/providers and/or users. For example, in an advertising context, if the status 276*a* indicates that the second user likely consumed an advertisement associated with step 272*a*, then the network/service operator/provider and/or the first user may receive a first level of compensation from a sponsor of the advertisement, and if the status 276*a* indicates that the second user likely ignored the advertisement, then the network/service operator/provider and/or the first user may receive a second level of compensation from the sponsor that is less than the first level of compensation.

Figure 2B:
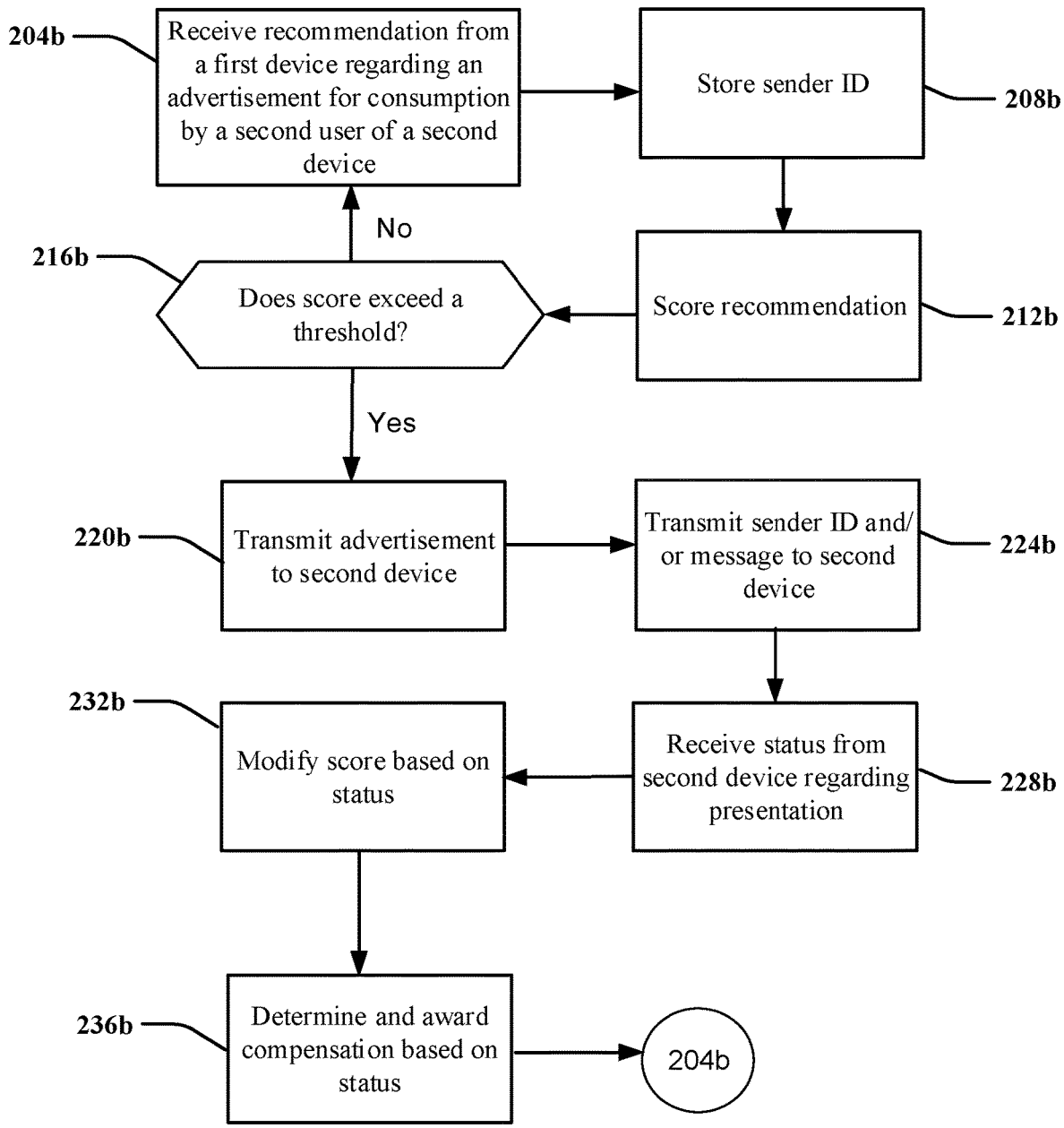
FIGS. 2B-2D depict illustrative embodiments of methods in accordance with various aspects described herein.

FIG. 2B depicts an illustrative embodiment of a method 200*b* in accordance with various aspects described herein. For example, the method 200*b* may be executed to provide recommendations regarding one or more media items (or one or more identifications of the media item(s)) to a device (e.g., a user device). The media item(s) may be accompanied by an identification of one or more senders of the recommendations. The method 200*b* may be executed in conjunction with one or more systems, devices, and/or components, such as for example the systems, devices, and/or components described herein. For purposes of simplicity of explanation, the method 200*b* is described below in conjunction with an advertisement. One skilled in the art will appreciate, based on a review of this disclosure, that the method 200*b* may be adapted to refer to any other type of media/content item.

In block 204*b*, a recommendation may be received from a first device (e.g., a first client device) regarding an advertisement. The recommendation may be provided by the first device based on a determination by a first user of the first device that the advertisement is likely of interest to a second user of a second device (e.g., a second client device). The recommendation may identify the second user, the second device, or a combination thereof. The recommendation may include a message that may be directed to the second user with an explanation (or other indication) of the reasons why the second user may find the advertisement interesting/relevant.

In block 208*b*, a sender identification may be stored. Referring back to the description above regarding block 204*b*, the sender identification stored in block 208*b* may include an identification of the first device, an identification of the first user, or a combination thereof.

In block 212b, the recommendation may be scored. The scoring may be based on one or more factors, such as for example one or more of the factors described above in connection with the system 200a of FIG. 2A.

In block 216b, a determination may be made whether the score of block 212b exceeds a threshold. The threshold may be specified in one or more ways. For example, the threshold may ensure that a sufficient (e.g., minimum) number of advertisements are selected for the second user/second device. Alternatively, or additionally, the threshold may be used to filter-out/remove advertisements that fall below a criteria established for the second user/second device in terms of, e.g., relevance of the subject matter of the advertisements.

If the determination of block 216b indicates that the score for the advertisement exceeds the threshold (e.g., the "yes" path is taken from block 216b), flow may proceed to block 220b. Otherwise (e.g., the "no" path is taken from block 216b), flow may proceed to block 204b to receive additional recommendations from the first user/first device.

In block 220b, the advertisement may be transmitted to the second device.

In block 224b, the sender identification (of block 208b) may be transmitted to the second device. To the extent that the recommendation of block 204b included a message, the message may be transmitted to the second device as part of block 224b.

While the blocks 220b and 224b are shown separately, in some embodiments the advertisement, the sender identification, and/or the message, in any combination, may be provided to the second device as part of a common transmission.

In block 228b, a status regarding a presentation of the advertisement may be received from, e.g., the second device. The status of block 228b may include the information/data described above in connection with the system 200a of FIG. 2A.

In block 232b, the score calculated for the advertisement in block 212b may be modified based on the status of block 228b. For example, if the status indicates that the advertisement likely was consumed by the second user, the advertisement (or a second advertisement related to the advertisement in terms of, e.g., subject matter content) may receive an increase in its associated score and/or future recommendations received from the first user/first device may receive additional weight relative to recommendations from other users/devices. Conversely, if the status indicates that the advertisement likely was not consumed by the second user, the advertisement (or the second advertisement) may receive a decrease (e.g., a penalty) in its associated score and/or future recommendations received from the first user/first device may receive less weight relative to recommendations from other users/devices.

In block 236b, compensation due to a network/service operator/provider and/or the first user may be determined based on the status of block 228b. For example, if the status indicates that the advertisement likely was consumed by the second user, a sponsor may compensate the network/service operator/provider and/or the first user with a first level of compensation. If the status indicates that the advertisement likely was not consumed by the second user, the sponsor may compensate the network/service operator/provider and/or the first user with a second level of compensation that is less than the first level of compensation. In some embodiments, if the status indicates that the advertisement likely was consumed by the second user, the first user may be compensated by the network/service operator/provider as an incentive for providing a good/quality recommendation.

From block 236b, flow may proceed to block 204b to receive additional recommendations from the first user/first device.

Figure 2C:
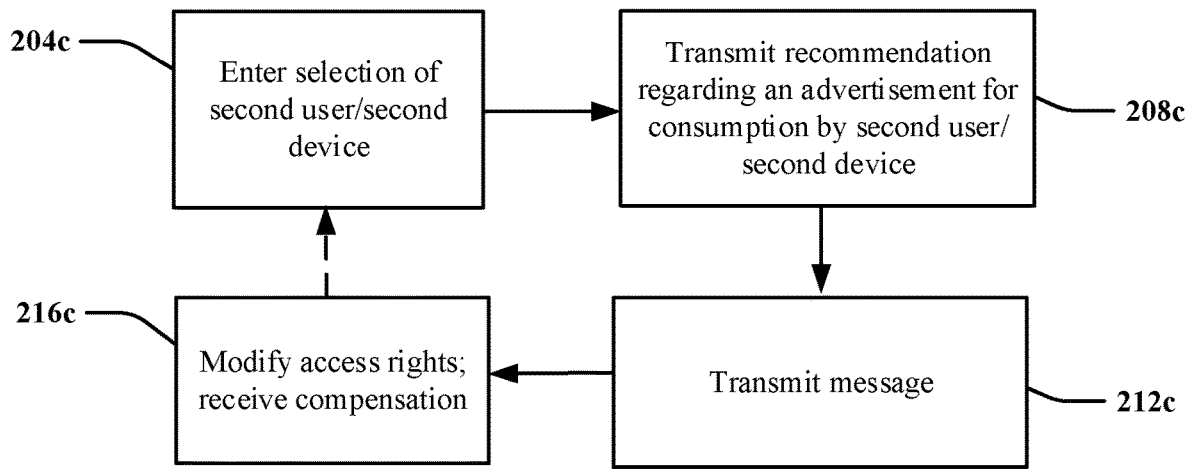

Referring now to FIG. 2C, an illustrative embodiment of a method 200c is shown in accordance with various aspects described herein. For example, the method 200c may be executed by a first device to provide recommendations regarding one or more media items to a second device (e.g., a user device). The media item(s) may be accompanied by an identification of one or more senders of the recommendations. More generally, the method 200c may be executed in conjunction with one or more systems, devices, and/or components, such as for example the systems, devices, and/or components described herein. For purposes of simplicity of explanation, the method 200c is described below in conjunction with an advertisement. One skilled in the art will appreciate, based on a review of this disclosure, that the method 200c may be adapted to refer to any other type of media/content item.

In block 204c, a first user of a first device may select a second device or a second user of the second device. For example, the selection may be obtained from a listing of contacts for the first user. The listing of contacts may be based on a social media platform, an email database, a phone database, an instant messenger database, a locations pattern application, or a combination thereof. This listing of contacts may be stored in one or more databases.

In block 208c, a recommendation may be transmitted by the first device. The recommendation may identify an advertisement that the first user believes will likely be of interest to the second user. The recommendation may be transmitted from the first device to the second device and/or to another device, such as for example a server.

In block 212c, a message may be transmitted by the first device. The message may include an explanation, a rating, or some other indication of the relevance of the advertisement to the second user as perceived by the first user. The message may be transmitted from the first device to the second device and/or to another device, such as for example the server.

In block 216c access rights may be updated/modified based on a status associated with the recommendation/advertisement of block 208. For example, if the status indicates that the first user is likely pushing junk (frequently referred to as "spam" in the art) to the second device/second user, the first user may be prohibited from (directly) providing recommendations for the second user/second device in the future. If the status indicates that the advertisement was likely consumed by the second user, the first user may be compensated in block 216c.

Assuming that the first user/first device still has access rights following the execution of block 216c, flow may proceed from block 216c to block 204c in order to form a loop and allow the first user/first device to provide additional recommendations for the second user/second device. On the other hand, if the access rights are limited (e.g., terminated) following execution of block 216c, the method 200c may end at block 216c.

Figure 2D:
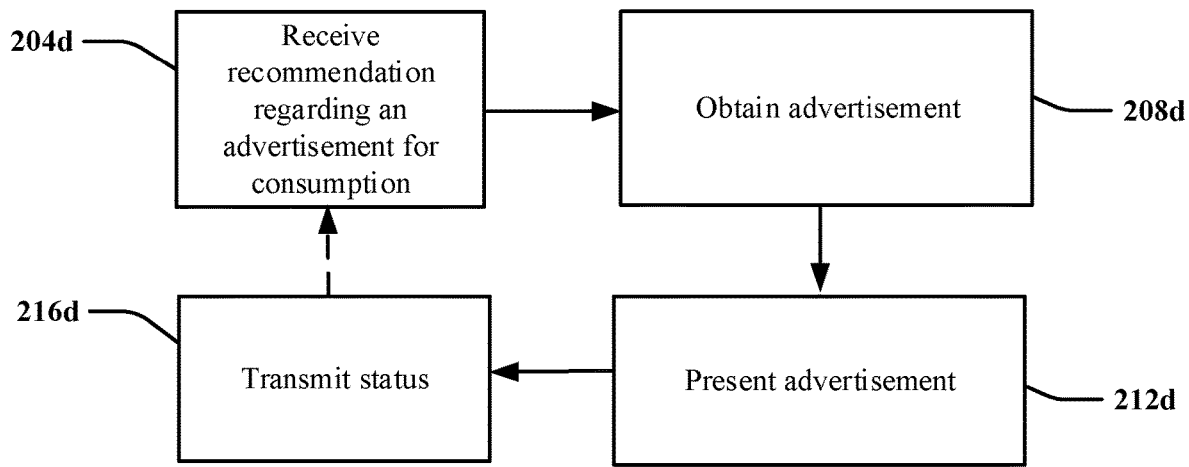

Referring now to FIG. 2D, an illustrative embodiment of a method 200d is shown in accordance with various aspects described herein. For example, the method 200d may be executed by a second device to receive recommendations regarding one or more media items from a first device (e.g., a user device). The media item(s) may be accompanied by an identification of one or more senders of the recommendations. More generally, the method 200d may be executed in conjunction with one or more systems, devices, and/or components, such as for example the systems, devices, and/or components described herein. For purposes of simplicity of explanation, the method 200d is described below in conjunction with an advertisement. One skilled in the art will appreciate, based on a review of this disclosure, that the method 200d may be adapted to refer to any other type of media/content item.

In block 204d, a recommendation for an advertisement may be received by a second device. The recommendation may originate from a first device. For example, the recommendation may be generated and/or transmitted from the first device. The recommendation may be received directly from the first device, or may be received from a third device (e.g., a server). In some embodiments, the recommendation of block 204d may include, or be accompanied by, a message that explains the relevance of the advertisement to the second user/second device as perceived by the first user/first device.

In block 208d, the advertisement may be obtained. For example, to the extent that the recommendation of block 204d includes an indication (e.g., an address) of a location of the advertisement, the advertisement may be obtained based on that indication.

In block 212d, the obtained advertisement may be presented on/by the second device. As part of step 212d, the second device may present an indication of the first user/first device.

In block 216d, the second device may transmit a status regarding the likelihood/probability that the second user consumed the advertisement. The status may be transmitted to the first device and/or the third device.

Assuming that the status of block 216d does not preclude further recommendations originating from the first user/first device being received by the second user/second device, flow may proceed from block 216d to block 204d in order to form a loop and allow the second user/second device to receive additional recommendations from the first user/first device. On the other hand, if access rights are limited (e.g., terminated) following execution of block 216d, the method 200d may end at block 216d.

While for purposes of simplicity of explanation, the respective processes are shown and described as a series of blocks in FIGS. 2B-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, while the methods 200b-200d are shown and described separately in connection with FIGS. 2B-2D, in some embodiments one or more aspects of a first of the methods may be combined with one or more aspects of one or more of the other methods.

In accordance with aspects of this disclosure, media items (e.g., advertisements) may be more likely to be consumed by target recipients on the basis of the media items being recommended by one or more contacts (e.g., friends) of the target recipients. In some embodiments, it may be determined that a sender of a recommendation likely is not interested in the subject matter associated with the recommendation; for example, the sender of the recommendation may not be interested in a product/service advertised in an advertisement. The sender may transmit/forward the advertisement (or an indication thereof) to the recipient based on a relationship (e.g., a pre-existing relationship) between the sender and the recipient. For example, based on that relationship, the sender may have a strong inclination/belief that the recipient will be interested in receiving the advertisement (or associated recommendation). In this respect, a network/service operator/provider may utilize the sender/first device as a proxy/agent for purposes of targeting media content to the recipient/second device.

Aspects of the disclosure may be based on connectivity between users and/or devices. In some embodiments, a user (e.g., a sender) may select one or more contacts (e.g., recipients) from a list of contacts. The sender may recommend an advertisement to be sent to the recipients, or another device such as a server. The advertisement may, or might not have, been presented to the sender. In some embodiments, whether the advertisement is sent to a particular recipient of the recipients may be based on priorities/scores that match a user profile (e.g., watching/viewing/listening and/or shopping habits, if available) associated with the recipient. The sender may add a message that explains the motivation for recommending the advertisement. Users/recipients may have an ability to block a contact/sender from sending advertisements to stop unwanted/excessive recommendations. Users/senders may receive incentives for recommending consumed advertisements. Whether an advertisement is consumed may be measured/determined by selections (e.g., clicks), exploration of referred sites, purchasing decisions/activities, etc.

Aspects of the disclosure may be used to enhance the efficiency of an advertising system/platform. For example, if a receiver/recipient knows that an advertisement has been sent by a contact, the recipient may tend to pay more attention to the advertisement than if the advertisement was received by the recipient in a more random manner/fashion. In this respect, aspects of the disclosure may increase user engagement with respect to advertisements. Furthermore, aspects of peer pressure may apply to the recipient, such that the recipient may be more likely to consume/engage the advertisement.

Aspects of the disclosure may be self-policing in the sense that a user/sender will likely only send recommendations and/or advertisements to a user/recipient if the sender reasonably believes that the recipient will be interested in the subject matter of the advertisement. For example, the sender likely will not send an advertisement to just anybody if the sender is unsure of the value of the advertisement to the recipient. In some embodiments, a sender may be required to be a validated/authenticated contact of the recipient before the sender may be allowed to send the recommendation or advertisement to the recipient. This may help to reduce the likelihood of a mass-transmission of the advertisement by the sender. Moreover, if a sender does begin to engage in abusive practices, the sender may effectively lose market share with respect to the recipient's attention (e.g., from the recipient's perspective, the sender may appear less like a contact and more like a nuisance/intruder).

In accordance with aspects of this disclosure, relationships of trust between users and/or devices may be leveraged to select advertisements that are likely of interest/relevance to a (recipient) user. As experience is gained, an advertising selection mechanism may be able to select advertisements for a recipient user/device with greater precision/accuracy in terms of the selected advertisements aligning with the recipient user's interests. In this manner, aspects of this disclosure may incorporate artificial intelligence and/or machine learning technologies to enhance targeted advertising technology.

Figure 3:
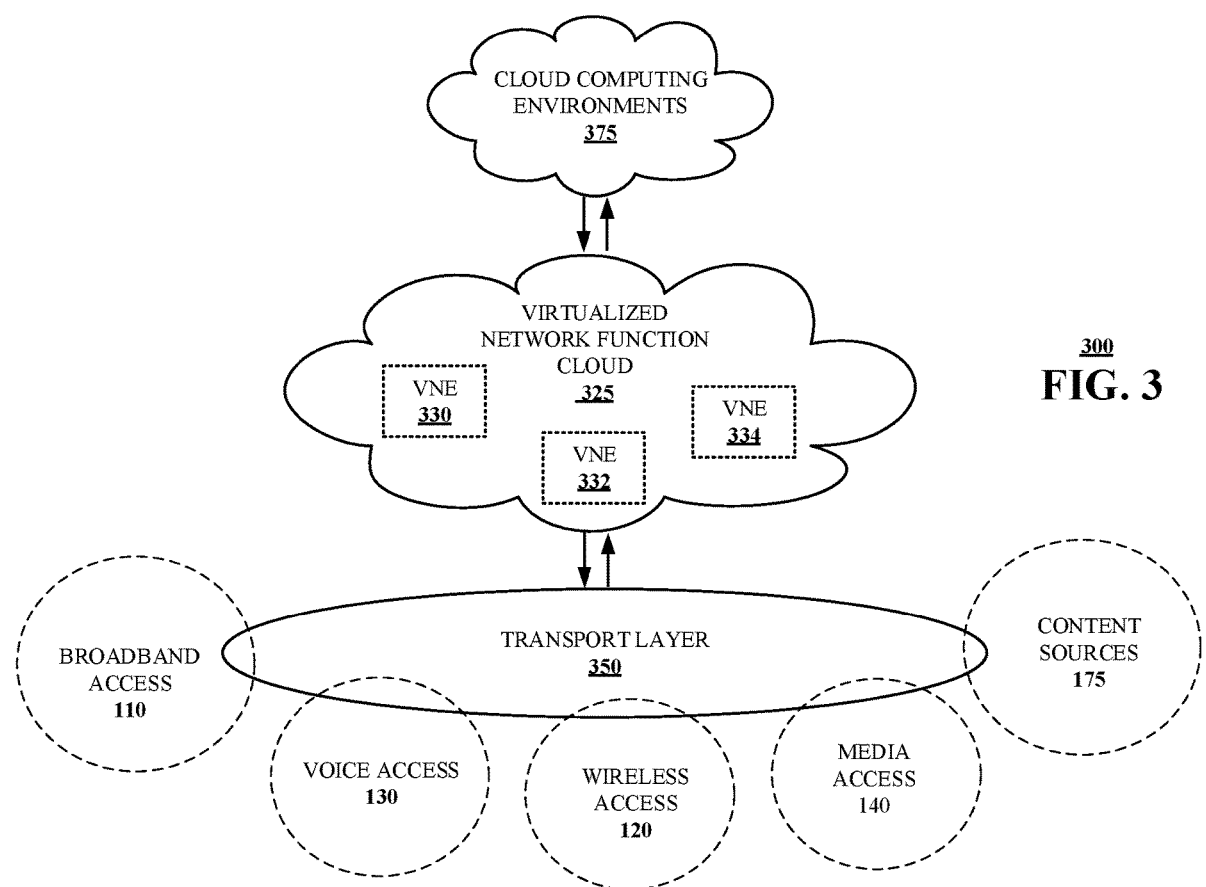
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the system 200*a*, and the methods 200*b*-200*d* presented in FIGS. 1-2D.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
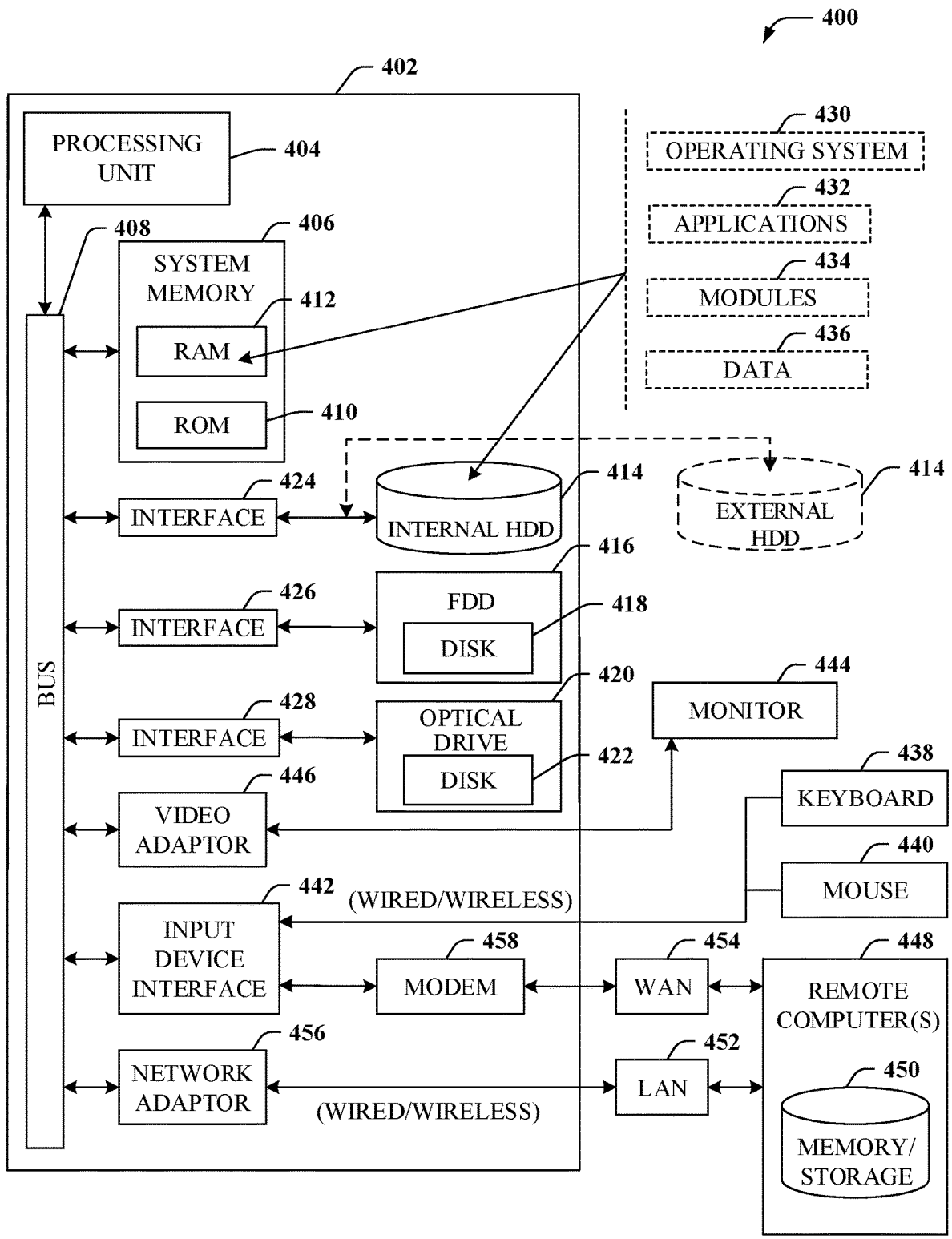
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
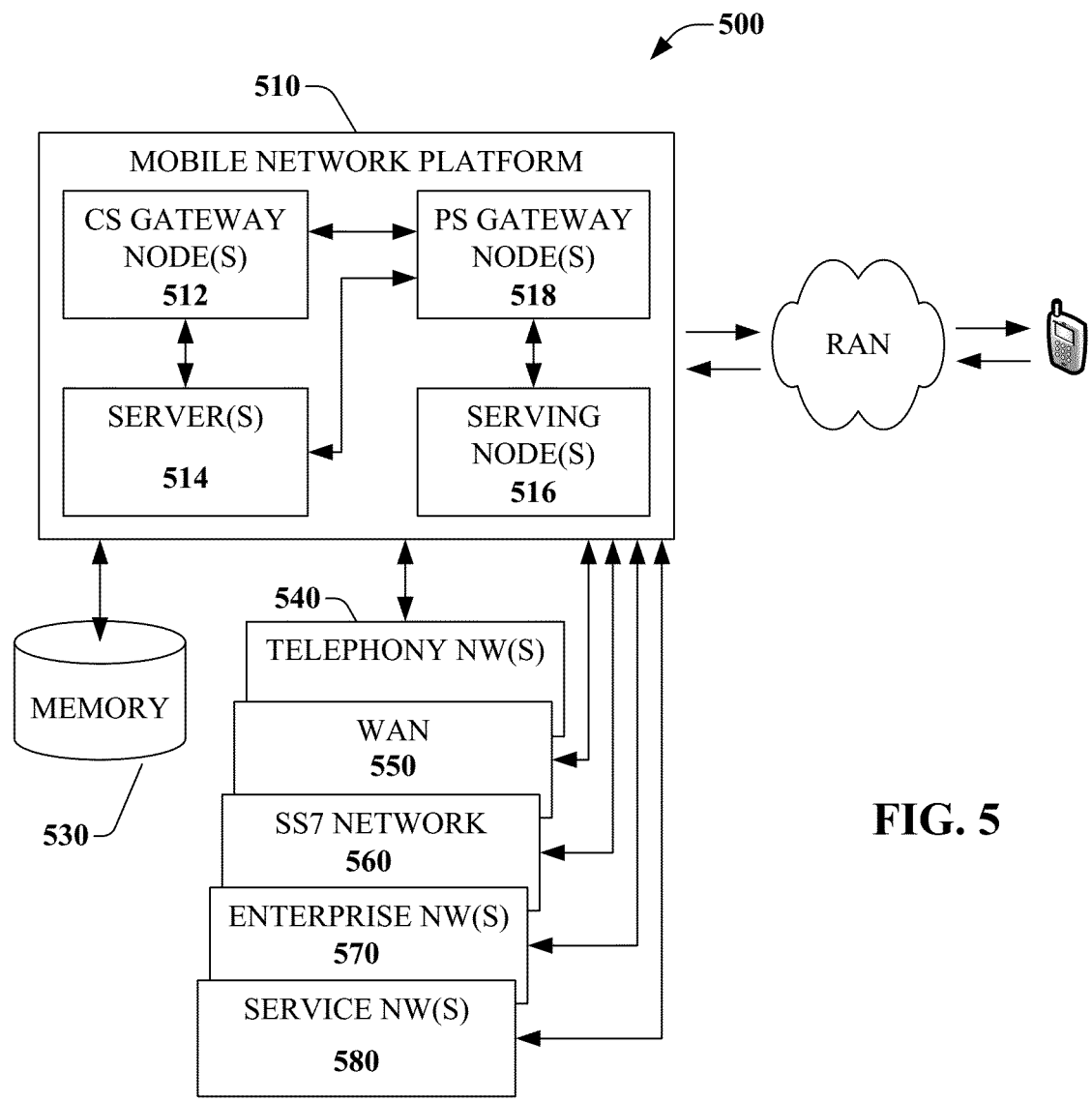
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s), packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s), convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
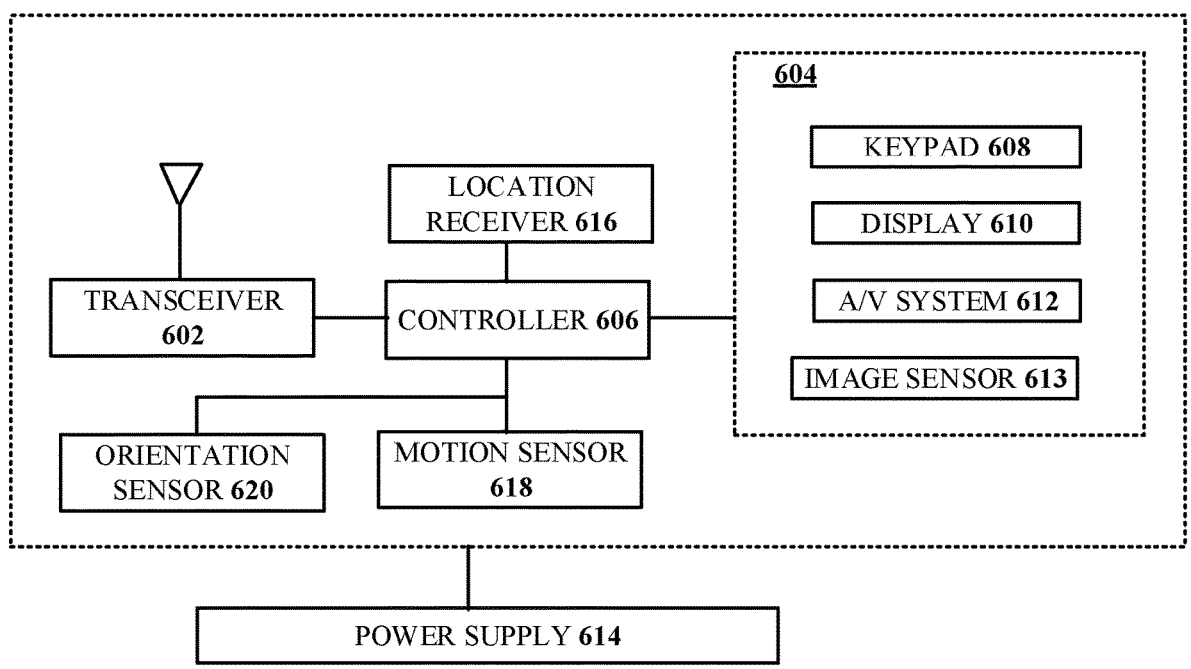
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a processing system including a processor; and
 a memory that stores executable instructions that, when executed by the processing system, facilitate performance of operations, the operations comprising:
  receiving, over a communication network, from a first client device, a recommendation pertaining to a first advertisement;
  storing a sender identification in association with an identification of the first advertisement, wherein the sender identification includes an identification of the first client device, an identification of a first user of the first client device, or a combination thereof;
  determining that a first score associated with the recommendation exceeds a threshold at least in terms of a likelihood of relevance of the first advertisement to a second user of a second client device;
  receiving, over the communication network, a plurality of advertisements associated with the second client device;
  determining a score for each of the plurality of advertisements resulting in a plurality of scores;
  sorting the first score and the plurality of scores resulting in a sorted plurality of scores;
  determining a second score of the sorted plurality of scores does not exceed the threshold;
  identifying a second advertisement associated with the second score;
  updating the plurality of advertisements by adding the first advertisement to the plurality of advertisements and removing the second advertisement from the plurality of advertisements resulting in an updated plurality of advertisements;
  receiving, over the communication network, a request for the updated plurality of advertisements from the second client device, wherein the second client device sends the request in response to detecting network traffic on the communication network is below a traffic threshold;
  based on the request, transmitting, over the communication network, the updated plurality of advertisements to the second client device based on the identification of the first advertisement;
  based on the request, transmitting, over the communication network, the sender identification to the second client device, wherein the updated plurality of advertisements including the first advertisement is displayed on the second client device, wherein the second client device sends the request based on a predesignated timeslot for an advertisement associated with a playback of a media content corresponding to programming, wherein the updated plurality of advertisements is selected for transmission to the second client device based on a duration of the predesignated timeslot matching a run-time of the first advertisement, wherein the second client device obtains the media content over a media content network, wherein the first advertisement is displayed in the predesignated timeslot associated with the playback of the media content on the second client device; and receiving, over the communication network, a notification that the first advertisement has been consumed in response to the second client device detecting the second client device displayed a web page associated with a product associated with the first advertisement.

2. The device of claim 1, wherein the operations further comprise:

scoring the recommendation to generate the first score based on a log of media previously provided to the second client device or the second user, a log of applications or programs executed by the second client device, a log of communication sessions that the second client device or the second user has engaged in, a log of products or services that the second user has consumed or purchased, a log of status regarding recommendations accepted or declined by the second client device or the second user, a contacts list associated with the second client device or the second user, a message included with the recommendation, or a combination thereof.

3. The device of claim 1, wherein the operations further comprise:

receiving, over the communication network, from the first client device, the identification of the first advertisement.

4. The device of claim 1, wherein the operations further comprise:

receiving, over the communication network, from the first client device, a message that explains the likelihood of relevance of the first advertisement to the second user; and based on the request, transmitting the message to the second client device.

5. The device of claim 1, wherein the operations further comprise:

receiving, over the communication network, from the second client device, a status regarding an engagement of the second user during a presentation of the first advertisement by the second client device.

6. The device of claim 5, wherein the operations further comprise:

modifying the first score, a third score associated with a third advertisement that is related to the first advertisement in terms of subject matter content, or a combination thereof, based on the status.

7. The device of claim 5, wherein the operations further comprise:

determining a compensation based on the status;

awarding at least a first part of the compensation to a network operator; and awarding at least a second part of the compensation to the first user of the first client device.

8. The device of claim 1, wherein the receiving of the request for the updated plurality of advertisements comprises receiving, over the communication network from the second client device, a request for the media content that includes the predesignated timeslot, wherein the transmitting of the updated plurality of advertisements to the second client device is further based on the request for the media content.

9. The device of claim 1, wherein the transmitting of the updated plurality of advertisements to the second client device is further based on a determination that the communication network that communicatively couples the device and the second client device is loaded in an amount that is less than the traffic threshold.

10. The device of claim 1, wherein the operations further comprise:

receiving, over the communication network, from the first client device, a recipient identification that includes an identification of the second client device, an identification of the second user, or a combination thereof, wherein the transmitting of the updated plurality of advertisements to the second client device is further based on having received the recipient identification from the first client device.

11. The device of claim 1, wherein the operations further comprise determining the threshold based on providing the second client device with a number of advertisements during a presentation of the media content on the second client device.

12. A non-transitory, machine-readable medium, comprising executable instructions that, when executed by a processing system including a processor, facilitate performance of operations, the operations comprising:

receiving, over a communication network, an identification of a first advertisement from a first device associated with a first user;

determining a first score associated with the first advertisement exceeds a threshold at least in terms of a likelihood of relevance of the first advertisement to a second user associated with a second device;

selecting the second user from a contacts list of the first user;

receiving, over the communication network, a plurality of advertisements associated with the second user;

determining a score for each of the plurality of advertisements resulting in a plurality of scores;

sorting the first score and the plurality of scores resulting in a sorted plurality of scores;

determining a second score of the sorted plurality of scores does not exceed the threshold;

identifying a second advertisement associated with the second score;

updating the plurality of advertisements by adding the first advertisement to the plurality of advertisements and removing the second advertisement from the plurality of advertisements resulting in an updated plurality of advertisements;

receiving, over the communication network, a request for the updated plurality of advertisements from the second device, wherein the second device sends the request in response to detecting network traffic on the communication network is below a traffic threshold;

in response to receiving the request, transmitting an identification of the first advertisement that the first user recommends for consumption by the second user to the second device based on the selecting of the second user and the request; and responsive to transmitting the identification of the first advertisement, transmitting a sender identification, wherein the sender identification includes an identification of the first user, an identification of the first device, or a combination thereof, wherein the second device obtains the updated plurality of advertisements including the first advertisement, wherein the updated plurality of advertisements including the first advertisement is displayed on the second device, wherein the second device sends the request based on a predesignated timeslot for an advertisement associated with a playback of a media content corresponding to programming, wherein the updated plurality of advertisements is selected for transmission to the second device based on a duration of the predesignated timeslot matching a run-time of the first advertisement, wherein the second device obtains the media content over a media content network, wherein the first advertisement is displayed in the predesignated timeslot associated with a playback of the media content on the second device; and receiving, over the communication network, a notification that the first advertisement has been consumed in response to the second device detecting the second device displayed a web page associated with a product associated with the first advertisement.

13. The non-transitory, machine-readable medium of claim 12, wherein the transmitting of the identification of the first advertisement is performed by the first device.

14. The non-transitory, machine-readable medium of claim 12, wherein the transmitting of the identification of the first advertisement is performed by a server.

15. The non-transitory, machine-readable medium of claim 12, wherein the identification of the first advertisement includes a storage location associated with the first advertisement.

16. The non-transitory, machine-readable medium of claim 12, wherein the contacts list is part of a social media application that executes on the first device.

17. A method, comprising:

transmitting, by a processing system including a processor, a request for an updated plurality of advertisements in response to detecting, by a processing system, network traffic on a communication network is below a traffic threshold;

receiving, over the communication network, by the processing system, the updated plurality of advertisements including a first advertisement, wherein a server determines a first score associated with a recommendation of the first advertisement from a first client device associated with a first user exceeds a threshold at least in terms of a likelihood of relevance of the first advertisement to a second user, wherein the server receives a plurality of advertisements associated with the processing system, wherein the server determines a score for each of the plurality of advertisements resulting in a plurality of scores, wherein the server sorts the first score and the plurality of scores resulting in a sorted plurality of scores, wherein the server determines a second score of the sorted plurality of scores does not exceed the threshold, wherein the server identifies a second advertisement associated with the second score, wherein the server updates the plurality of advertisements by adding the first advertisement to the plurality of advertisements and removing the second advertisement from the plurality of advertisements resulting in the updated plurality of advertisements;

receiving, over the communication network, by the processing system, a sender identification, wherein the sender identification includes an identification of the first user that recommended the first advertisement, an identification of the first client device, or a combination thereof;

presenting, by the processing system, an indication of the sender identification on a display;

obtaining, by the processing system, over a media content network, the media content corresponding to programming;

presenting, by the processing system, the first advertisement in a predesignated timeslot for an advertisement during a playing of the media content on the display; and transmitting, by the processing system, a status regarding a likelihood of consumption of the first advertisement by the second user in response to detecting display of a web page associated with a product associated with the first advertisement, wherein the processing system transmits the request based on the predesignated timeslot for the advertisement associated with the playing of the media content on the display, and wherein the updated plurality of advertisements is received by the processing system based on a duration of the predesignated timeslot matching a run-time of the first advertisement.

18. The method of claim 17, wherein the status indicates whether the second user selected the first advertisement via the processing system, and wherein the status indicates whether the second user purchased the product presented in the first advertisement.

19. The method of claim 17, wherein the status is based on a use of gaze tracking technology, a response to a survey or questionnaire, an indication of whether the second user was engaged in a communication session during the predesignated timeslot, or a combination thereof.

20. The method of claim 17, further comprising:

determining, by the processing system, that the second user is a contact of the first user in one or more applications executed by the processing system, wherein the one or more applications include a social media application, an email application, a phone application, an instant messaging application, a locations pattern application, or a combination thereof, wherein the receiving of the first advertisement is based on the determining that the second user is the contact of the first user in the one or more applications.

* * * * *